United States Patent Office 3,743,653
Patented July 3, 1973

3,743,653
HYDROXYETHYLATION WITH ETHYLENE SULFATE
Stephen Marburg, Plainfield, N.J., assignor to Merck & Co., Inc., Rahway, N.J.
No Drawing. Filed Dec. 28, 1970, Ser. No. 102,263
Int. Cl. C07d 49/36
U.S. Cl. 260—309     5 Claims

ABSTRACT OF THE DISCLOSURE

A process for the preparation of 2-(p-fluorophenyl)-1-(2 - hydroxyethyl)-5-nitroimidazole starting with 2-(p-fluorophenyl)-4-(5-)nitroimidazole and ethylene sulfate is disclosed. The compound so produced is an active antiparasitic agent.

SUMMARY OF THE INVENTION

This invention is concerned with a process for introducing a 2-hydroxyethyl group into a nitroimidazole heterocyclic nucleus at the 1-position starting with the 1-unsubstituted nitroimidazole derivative. This is accomplished with the use of ethylene sulfate.

DESCRIPTION OF THE INVENTION

From hydrolytic studies, it is known that ethylene sulfate is a highly reactive molecule which undergoes C—O bond rather than S—O bond cleavage on reaction with nucleophiles. 1-unsubstituted-5-nitroimidazole derivatives are nucleophilescapable of reacting with ethylene sulfate, cleaving the C—O bond, and producing the sulfuric acid ester of the hydroxyethyl derivative, which can be saponified with the 2-hydroxyethyl derivative. Ethylene sulfate is a highly reactive reagent which is reacted without a solvent although a non-polar solvent has been used with somewhat reduced yields. When the reaction is conducted without a solvent at elevated temperatures that is, as a melt, sufficient ethylene sulfate is employed to produce a mobile liquid melt at the temperature at which the reaction is run. From 1 to 2 moles of ethylene sulfate for each mole of the imidazole derivative has been found generally sufficient. The reaction is run at an elevated temperature of from 75 to 125° C. with from 90 to 110° C. most generally employed for optimum results. The progress of the reaction can be followed by removing aliquots from the reaction mixture and taking a nuclear magnetic resonance spectrum thereof. The increase of the intensity of the aromatically substituted ethylene group peaks indicates the production of product. In general, heating at from 90 to 110° C. produces optimum yields in from ½ to 4 hours. The reaction mixture is then treated with an aqueous mineral acid solution at elevated temperatures. Maintaining the aqueous mineral acid solution at the reflux temperature of said solution for a duration of from ½ to 4 hours has proven to be preferable. The concentration of the acids most satisfactory for this step is from 1 to 6 normal. The mineral acids preferred for the saponification are hydrochloric, sulfuric, nitric and phosphoric acids. The acidic aqueous solution is employed in a volume in excess of a volume equivalent to the reaction mixture to which it is added. In general, from 2 to 10 volues of acid solution for each volume of total reaction mixture is sufficient. During this time the hydroxyethyl sulfuric acid ester intermediate, which is not isolated, is saponified to the desired hydroxyl compound. The remainder of the isolation of the product is accomplished by techniques known to those skilled in this art.

PREFERRED EMBODIMENT OF THE INVENTION

The preferred embodiment of this invention is best shown by the following flow chart:

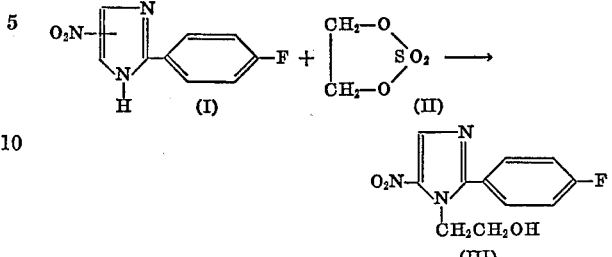

In the preferred embodiments of this invention one molar equivalent to 2-(p-fluorophenyl)-4(5)-nitroimidazole (I) the preparation of which is described in U.S. Pat. 3,399,211, is treated with 1.25 molar equivalents of ethylene sulfate (II), the preparation of which is described in the Journal of the Chemical Society, of 1932, p. 86. The product (III) as isolated from the reaction mixture by techniques herein described possesses antiparasitic activity against enterohepatitis, also known as turkey blackhead disease, and trichomoniasis. The preferred compound of the invention is especially active against the specific trichomoniasis parasitic infections T. foetus and T. vaginalis.

While the process of the instant invention is described in terms of the specific starting compound, 2-(p-fluorophenyl-4(5)-nitroimidazole, the process is a general one, applicable to imidazoles differing in substitution. Other substituents on the benzene ring may be other halogens than fluorine such as chlorine or bromine, nitro, amino, loweralkyl such as methyl, ethyl and propyl, and the like.

In order that this invention may be more fully understood the following example is presented which should not be construed as limitative of the invention.

1 g. (4.82 mmoles) of 2-(p-fluorophenyl-4(5)-nitroimidazole and 0.75 g. (6.05 mmoles) of ethylene sulfate are combined in a centrifuge tube and heated in an oil bath at 100° C. for 10 minutes. The temperature is raised to 110° C. and maintained at that point for 10 minutes, after which considerable darkening is observed. A nuclear magnetic resonance spectrum at this point shows an incomplete reaction. The heating is continued at 110° C. for an additional two hours. The residue is then refluxed in 10 ml. of 4 N HCl for two hours. Upon cooling, a precipitate of 400 mg. of 2-(p-fluorophenyl)-4(5)-nitroimidazole, M.P. 217 t o219° C. is obtained by filtration. The filtrate is made basic to a pH of 8.5 with concentrated ammonia. Upon standing overnight there is deposited 100 mg. of 2-(p-fluorophenyl) - 1 - (2 - hydroxyethyl)-5-nitroimidazole, M.P. 154 to 157° C. Purification by techniques known in the art raises the melting point to 165° C.

What is claimed is:

1. A process for the preparation of a compound having the formula:

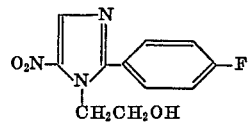

which comprises combining one mole of a compound having the formula:

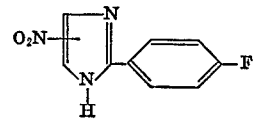

with from 1 to 2 moles of a compound having the formula:

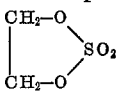

heating the combined reactants as a melt or in a non-polar solvent at from 75–125° C. and treating the resultant reaction mixture with an aqueous mineral acid solution of from 1 to 6 normal at the reflux temperature.

2. The process of claim 1 in which the ethylene sulfate is reacted at a temperature of from 90 to 110° C. for a duration of from ½ to 4 hours and the aqueous mineral acid solution is maintained at the reflux temperature for from ½ to 4 hours.

3. The process of claim 1 in which the aqueous mineral acid solution is hydrochloric, sulfuric, nitric or phosphoric acids.

4. The process of claim 3 in which the aqueous mineral acid solution is hydrochloric acid.

5. The process of claim 1 in which the aqueous mineral acid solution is employed in a concentration of from 1 to 6 normal.

References Cited
UNITED STATES PATENTS
3,154,526   10/1964   Klass et al. _____ 260—79.3

HARRY I. MOATZ, Primary Examiner